Patented June 19, 1945

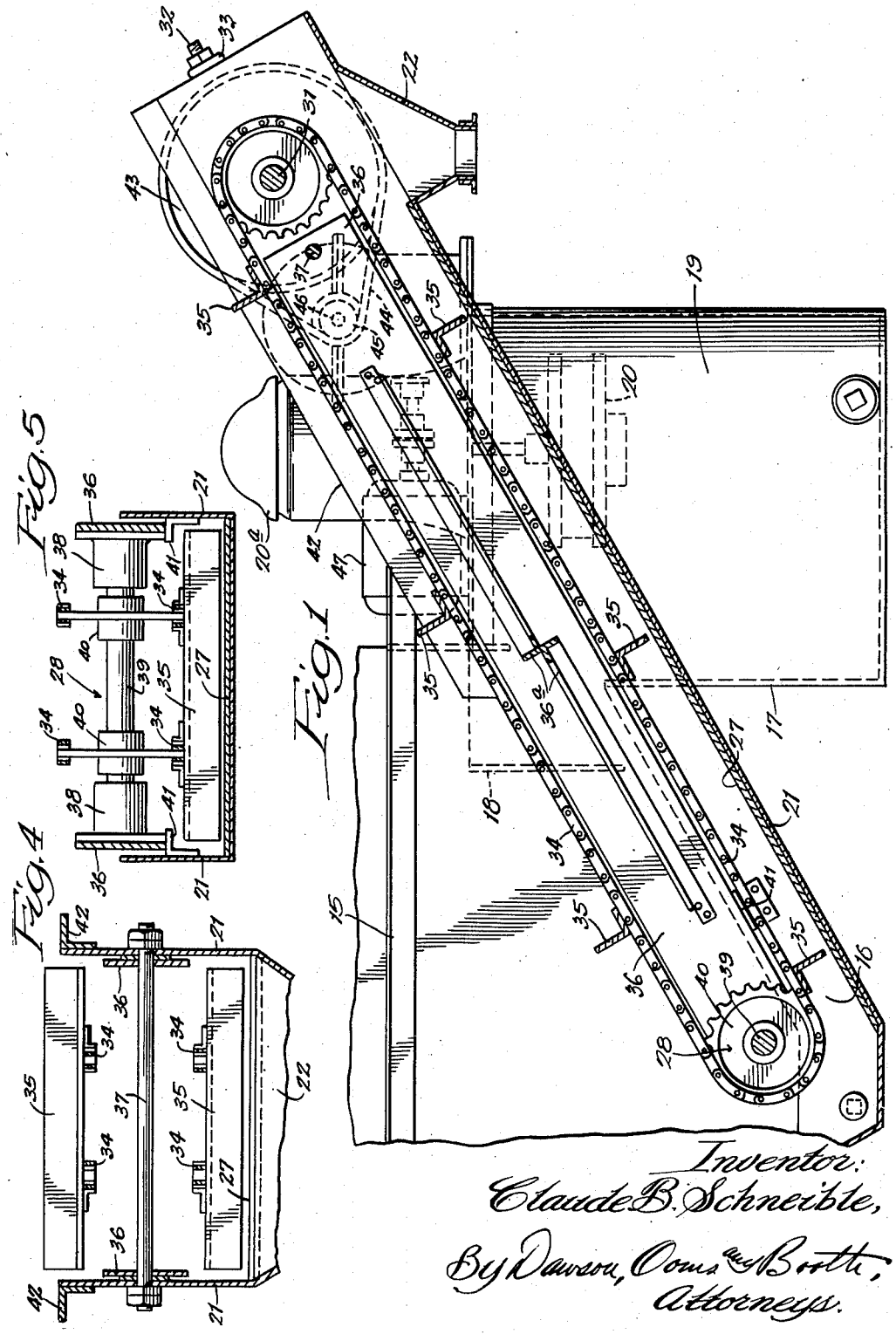

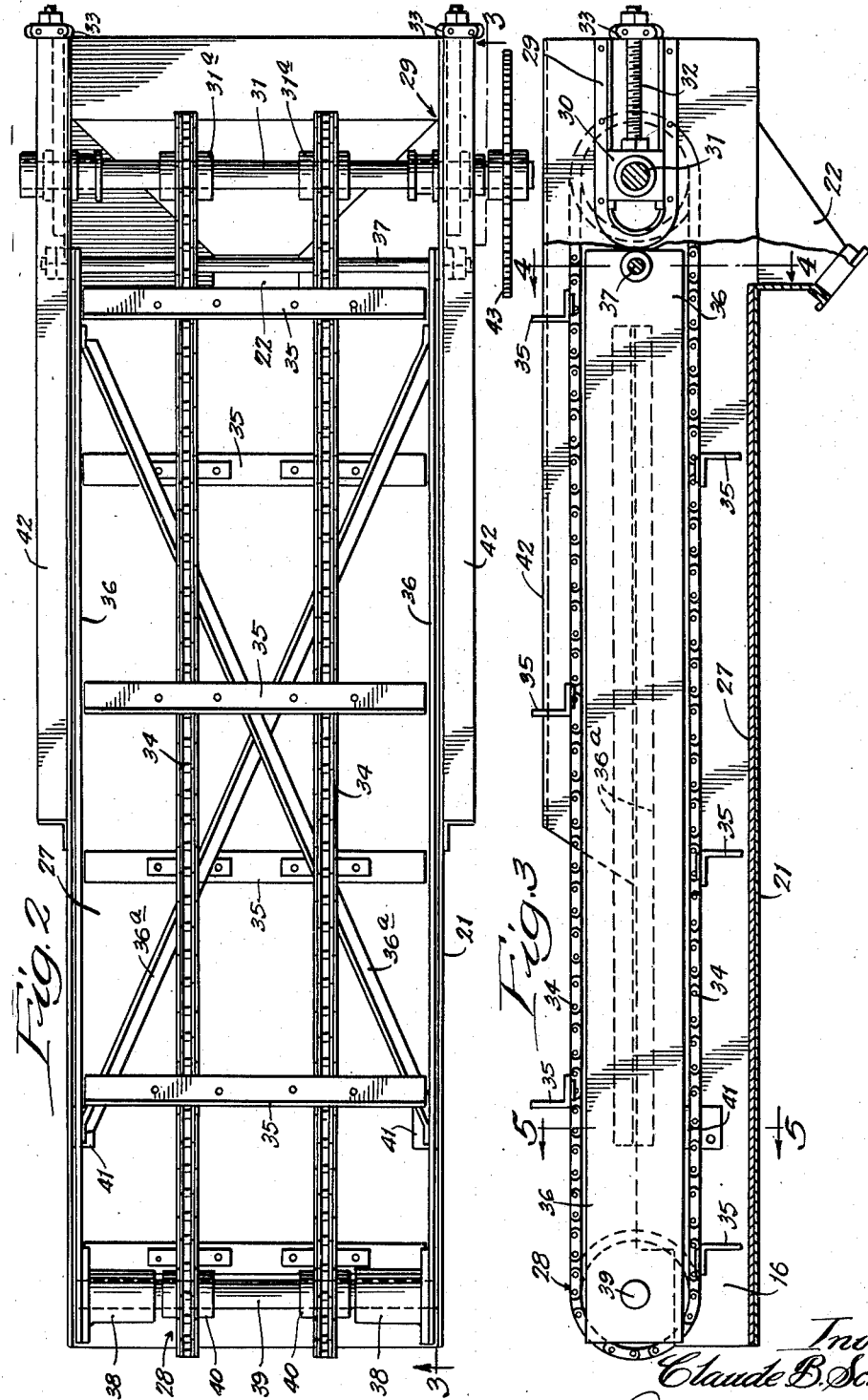

2,378,798

UNITED STATES PATENT OFFICE 2,378,798

SEPARATING APPARATUS

Claude B. Schneible, Detroit, Mich.

Application July 22, 1942, Serial No. 451,831

5 Claims. (Cl. 210—55)

This invention relates to separating apparatus. It is particularly useful in the removal of particulate matter washed from air and other gases. Other uses will be obvious.

An object of the invention is to provide apparatus in which dust or other foreign particles removed from air or gases and washed into a receptacle may be constantly eliminated with a minimum of power consumption and injury to or stoppage of the apparatus. A further object is to provide effective means whereby foreign particles may be eliminated without injury to or stoppage of the conveyor means and with a minimum of wear, while at the same time enabling the conveyor to be made readily accessible for cleaning. Other specific objects and advantages will appear as the specification proceeds.

The invention is illustrated in a preferred embodiment by the accompanying drawings, in which—

Figure 1 is a side view in elevation of apparatus embodying my invention, a portion of the structure being shown in section; Fig. 2, a detailed plan view of the conveyor employed; Fig. 3, a side view of the conveyor structure, the view being taken as indicated at line 3 of Fig. 2, a portion of the figure being broken away; Fig. 4, a transverse sectional view, the section being taken as indicated at line 4 of Fig. 3; and Fig. 5, a transverse sectional view, the section being taken as indicated at line 5 of Fig. 3.

The present invention includes a conveyor mounted within any suitable type of tank wherein solids collect in a portion thereof. The conveyor is preferably mounted within an inclined trough or channel extending into the tank, the upper portion of the conveyor being driven by a motor and the lower portion of the conveyor which extends into the bottom portion of the tank being floating or yieldably mounted for movement toward and away from the surface along which the solids are to be propelled. It will be understood that the conveyor structure may be employed with a great variety of tanks or containers and the tank set out herein is utilized merely to illustrate the invention.

In the illustration given, 15 designates a tank which may be provided, if desired, with tapered walls leading to a solids-collecting portion indicated by the numeral 16. The tank may be provided with a weir 17 and a skimmer 18, the weir 17 separating the main chamber from a clear liquid chamber 19. The chamber 19 may, if desired, be provided with a pump 20 driven by motor 20ª by means of which the clear liquid may be forced to any desired point. Since such structure is optional and may be modified widely, a further detailed description is believed unnecessary.

In the structure embodying my invention, the tank 15 is provided with an inclined trough or channel 21 having at its upper end an outlet 22, as shown more clearly in Fig. 1.

Within the sheet metal trough 21 is mounted at the base thereof a wear plate 27 which is removable, and above the wear plate 27 is mounted a conveyor unit 28. The conveyor unit may be of any suitable type or structure. In the illustration given, the side walls of the trough 21 near the top thereof are each provided with a U-shaped shaft support 29. Mounted in each shaft support is a journal block 30 receiving an end of the shaft 31. The journal block 30 is adjustable within the member 29 by means of the screw 32 extending through the nut 33. Mounted upon the shaft 31 is a pair of sprockets 31ª, each adapted to receive and drive the links of a chain 34. The chain is provided at spaced intervals with drag bars or plates 35.

As shown more clearly in Figs. 3 and 4, a pair of conveyor frame bars 36 are pivotally mounted upon the trough walls 21 by means of the pivot pin 37. The bars 36 extend rearwardly and are provided at their ends with journals 38 for receiving the rear sprocket shaft 39. Fixed upon the shaft 39 are the sprocket wheels 40. It will be noted that the shaft 39 is floating within the trough 21 and is free to swing upwardly upon pivot 37. To prevent the drag bars from resting too heavily upon the wear plate 27, I provide stops 41, as shown more clearly in Fig. 5, for supporting the conveyor frame bar 36 in a desired spaced position. Any number of stops may be employed.

If desired, the top of the trough may be provided with angle iron members 42, as shown more clearly in Fig. 4.

Any suitable means for driving the shaft 31 may be employed. In the illustration given, the end of shaft 31 is provided with a sprocket wheel 43 and the wheel is driven by a chain 44 engaging a driving sprocket 45. The sprocket 45 is carried by a shaft 46 driven through reduced gear connections by motor 47. It will be understood that any suitable means may be employed for driving the shaft 31.

In order to brace and strengthen the frame bars 36, I provide the cross bars 36a, as shown more clearly in Fig. 2.

Operation

In the operation of the device, liquid containing solids is introduced into the tank 15 in any suitable manner. The solids and liquid may come from another apparatus connected therewith, or they may be simply conveyed into the tank. In the tank, the solids tend to settle toward the lowest portion indicated by the numeral 16, where they may be engaged by the conveyor vanes 35. The clear liquid passes over weir 17 into the clear liquid chamber 19. The liquid may be withdrawn through the outlet pipe, or, if desired, may be pumped by the pump mechanism 20 to any suitable point.

The sludge which is collected within the chamber 16 of the tank is now discharged by means of the conveyor mechanism described. The shaft 31 is driven by the mechanism described, or by any suitable mechanism, in a counter-clockwise direction, thus causing the vanes 35 to move upwardly over the wear plate 27 to carry the solids toward the outlet 22.

The pivotal support for the lower sprocket 39 enables it to assume a floating position with respect to obstructions, heavy particles, etc., so that the shaft 39 may be moved toward and away from the wear plate in its operation in the lower portion of chamber 23. By this floating structure, it is found that the irregular type of material found in the lower portion of the chamber can be handled with facility and without danger of obstructing or injuring the apparatus.

If desired, springs or other means may be employed to support the shaft 39 in the floating position shown. In actual operation, however, the weight of the conveyor is found sufficient to maintain it in close and effective operating relation to the wear plate so that sludge is carried steadily upwardly to the outlet 22. Should large obstructions be engaged, the conveyor shaft 39 yields upwardly to permit it to be carried out of the chamber.

With the floating structure shown, breakage of the conveyor chain due to stoppage of the conveyor by obstructions lodging beneath is prevented. There is further a saving in power due to the elimination of the tendency of the material to jam beneath the conveyor drag irons and wear sheet if the floating construction were not employed. There is less wear upon the plate 27 due to the fact that the conveyor is free to move up and down or float instead of being held in a constant position in which the material would drag heavily between the drag irons and the wear plate.

The conveyor can be readily cleaned due to the pivotal or floating structure since it can be raised out of the water without disengaging the conveyor from the tank. Further, the conveyor is removable as a unit, making replacements easy, and there is no necessity for removing any part of the tank or conveyor trough.

While in the illustration given, I have shown a single stop on the lower side of the trough, it will be understood that stops may be employed if desired to limit the upward movement of the conveyor, and further, if desired, spring tension may be employed for such limitation of movement in either direction.

While in the illustration given, I have set forth a specific structure and a number of specific details for the purpose of illustrating the invention, it will be understood that those skilled in the art may readily modify such details of structure and substitute equivalent means without departing from the spirit of my invention.

I claim:

1. In separator apparatus of the character set forth, a receptacle provided with an upwardly and laterally-extending discharge trough, said trough having a closed bottom and sides and being provided with an outlet at its upper portion and an inlet communicating with the lower portion of the receptacle, an endless conveyor mounted in said trough and comprising a drive shaft fixed in the upper portion of said trough, frame plates pivotally secured to said trough, a shaft secured to the free ends of said plates, endless conveying means carried by said shafts, drag bars carried by said endless conveying means, and means for driving said drive shaft.

2. In separator apparatus of the character set forth, a tank provided with an upwardly and laterally-inclined trough, said trough having a closed bottom and sides and being provided with an outlet at its upper portion and with an inlet at its lower portion communicating with the lower portion of the tank, a shaft mounted in the upper end of said trough and provided with a pair of spaced sprockets, frame plates pivotally mounted upon said trough, a shaft secured to the lower free ends of said frame plates and provided with sprockets, chains mounted upon said opposed sprockets on said shafts, drag bars carried by said chains, and means for driving the upper of said shafts.

3. In combination, a receptacle having an upwardly-inclined discharge trough provided with an outlet at its upper end, said trough having closed sides and bottom and being provided with an inlet at the lower end thereof communicating with the lower portion of the receptacle an endless conveyor mounted in said trough, the lower portion of said conveyor extending into the lowermost part of said receptacle and freely movable upwardly and downwardly within said trough, means in said receptacle for limiting the downward movement of said conveyor in said trough, said receptacle being adapted to receive solids-laden liquid therein adjacent the lower portion of said conveyor, a weir extending across said receptacle and below the liquid level therein so as to concentrate clear liquid on one side thereof and solids on the other side thereof adjacent said conveyor bottom, and means for driving said conveyor.

4. In combination, a receptacle having an upwardly-inclined discharge trough provided with an outlet at its upper end, said trough having closed sides and bottom and being provided with an inlet at its lower end communicating with the lower portion of the receptacle an endless conveyor mounted in said trough, the lower end of said conveyor extending into the lowermost part of said receptacle and movable freely upwardly and outwardly within said trough, means within said receptacle for limiting the downward movement of said conveyor within said trough, said receptacle being adapted to receive solids-laden liquid therein adjacent the lower portion of said conveyor, a weir extending across said receptacle and below the liquid level therein so as to concentrate clear liquid on one side thereof and solids on the other side thereof adjacent said conveyor bottom, a skimmer plate extending across said receptacle and from below the liquid level therein and above the bottom of the receptacle to above the surface of the liquid to prevent floating material from going into the clear liquid chamber formed on one side of said weir, and means for driving said conveyor.

5. In separator apparatus of the character set forth, a receptacle provided with an upwardly and laterally-extending discharge trough, said trough having a closed bottom and sides and being provided with an outlet at its upper portion and with an inlet at its lower portion communicating with the lower portion of the receptacle, a conveyor mounted in said trough, said conveyor including a frame which is pivotally mounted at its upper end to said trough and which is free to move about its pivoted mounting, a shaft at each end of said conveyor frame, endless conveying means carried by said shafts, and drive means for propelling said conveying means about said shafts.

CLAUDE B. SCHNEIBLE.